United States Patent
Bonath et al.

(10) Patent No.: US 11,561,159 B2
(45) Date of Patent: Jan. 24, 2023

(54) RADIOMETRIC DENSITY MEASUREMENT

(71) Applicant: VEGA Grieshaber KG, Wolfach (DE)

(72) Inventors: Roland Bonath, Haslach (DE);
Matthias Harter, Schenkenzell (DE);
Winfried Rauer, Fischerbach (DE);
Natalie Waldecker, Ortenberg (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/185,515

(22) Filed: Feb. 25, 2021

(65) Prior Publication Data

US 2021/0262910 A1 Aug. 26, 2021

(30) Foreign Application Priority Data

Feb. 26, 2020 (DE) ...................... 10 2020 202 482.0

(51) Int. Cl.
*G01N 9/24* (2006.01)
(52) U.S. Cl.
CPC ...................................... *G01N 9/24* (2013.01)
(58) Field of Classification Search
None
See application file for complete search history.

(56) References Cited

U.S. PATENT DOCUMENTS

| 4,580,052 A | 4/1986 | Hoffman et al. |
| 7,986,766 B2 | 7/2011 | Cahill |
| 8,792,611 B2 | 7/2014 | Cahill |
| 2010/0080352 A1* | 4/2010 | Cahill .................... G01N 23/10 378/54 |

FOREIGN PATENT DOCUMENTS

| DE | 1 719 570 U | 3/1956 |
| EP | 2 169 389 A1 | 3/2010 |
| WO | WO 2015/089347 A1 | 6/2015 |

OTHER PUBLICATIONS

United Kingdom Search Report dated Jul. 27, 2021 in Patent Application NO. GB2102517.6, 6 pages.

* cited by examiner

*Primary Examiner* — Edwin C Gunberg
(74) *Attorney, Agent, or Firm* — Oblon, McClelland, Maier & Neustadt, L.L.P.

(57) ABSTRACT

A radiometric measurement device is provided, including at least one at least partially bent source receiving tube configured to receive a radiation source; and at least one transmission tube configured to provide a guiding path within the transmission tube for at least a portion of radiation emitted by the radiation source, the source receiving tube and the transmission tube being arranged with respect to each other such that at least a portion of the radiation emitted by the radiation source is guidable in a straight line through a material disposable between the radiation source and a distal end of the transmission tube and the guide path, and the source receiving tube and the transmission tube being arranged adjacent to each other.

13 Claims, 3 Drawing Sheets

RADIOMETRIC DENSITY MEASUREMENT

CROSS-REFERENCE TO RELATED APPLICATION

The present application claims priority to German Patent Application No. 10 2020 202 482.0, filed Feb. 26, 2020, which is incorporated herein by reference in its entirety.

TECHNICAL FIELD

The present invention relates to a radiometric measurement device comprising a source receiving tube and a transmission tube, and to the use of a source receiving tube and a transmission tube in such a measurement device.

BACKGROUND

Radiometric measurement devices are basically known in the prior art and can be used, for example, in the processing and chemical industry to determine and monitor a density, a level and/or for level limit monitoring. These measurements can, for example, be made continuously and without contact, with the materials to be measured comprising fluids, solids, suspensions, or slurries. Such measuring devices are also suitable for use in extreme environmental conditions, such as high temperatures, high pressures, toxic, and/or corrosive materials.

A known radiometric measurement device may comprise a so-called transmission tube and a so-called source receiving tube. A radioactive radiation source, in particular a gamma radiation source, can be arranged in the source receiving tube, whereby the radiation source is arranged in such a way that it can emit a directed radiation through a medium and through the transmission tube. This radiation can subsequently be detected and evaluated by a corresponding detector device. Such a radiometric measurement device is known, for example, from EP 2 169 389 A1.

In this context, it has now become apparent that there is a need to further improve such a radiometric measurement device, in particular, there is a further need to provide a cost-effective and stable radiometric measurement device. It is therefore an object of the present invention to provide an improved radiometric measurement device, and more particularly, it is an object of the present invention to provide a radiometric measurement device that is as cost-effective and stable as possible.

These and other objects, which will be further mentioned when reading the following description or which may be recognized by the person skilled in the art, are solved by the subject matter of the independent claims. The dependent claims further develop the central idea of the present invention in a particularly advantageous manner.

SUMMARY

A radiometric measurement device according to the invention comprises: at least one at least partially curved source receiving tube for receiving a radiation source; at least one transmission tube for providing a guiding path within the transmission tube for at least a portion of the radiation emitted by the radiation source; wherein the source receiving tube and the transmission tube are arranged relative to each other such that at least a portion of the radiation emitted from the radiation source is guidable in a straight line through a material disposable between the radiation source and a distal end of the transmission tube and the guiding path; and wherein the source receiving tube and the transmission tube are arranged adjacent to each other.

As used herein, the term radiometric measurement device is to be broadly understood to include all measurement devices/devices based on a radiometric measurement principle and having at least one at least partially bent source receiving tube and at least one transmission tube. The term source receiving tube is also to be understood broadly as used herein and includes any tubular geometry suitable to receive a radiation source, preferably a gamma radiation source. Such a source receiving tube may be, for example, a tube or hollow cylinder made of a metal and/or a non-metallic material. The curved section of the source receiving tube serves to position the radiation source in such a way that the beam path of the radiation source can be guided through a free area between the adjacently arranged source receiving tube and the transmission tube, in which area the material/medium to be measured can be arranged. The term transmission tube is also to be understood broadly in the present context and includes any tube which can provide a guide path for the emitted radiation and is suitable for preventing material from entering the guide path. In this context, the transmission tube has two distal ends, one facing the position of the radiation source in the source receiving tube and the opposite distal end of the transmission tube being attachable to a flange member. The source receiving tube and the transmission tube are thereby arranged adjacent to each other, whereby the term adjacent is to be understood in such a way that the source receiving tube in particular is not arranged within the transmission tube, but both tubes are arranged quasi adjacent to each other. In this context, it should be noted that the term tube is not limited to tubes with circular cross-sections, but includes all elongated hollow bodies, for example also those with polygonal cross-sections, which are suitable for providing a corresponding measuring section or a corresponding reception for the radiation source.

The present invention is based on the finding that the two adjacently arranged tubes enable a comparatively inexpensive provision of a radiometric measurement device and, moreover, sufficient stability can also be provided. In particular, such an arrangement can be provided more simply in manufacture than a known tube-in-tube geometry. Furthermore, in such an arrangement, both tubes can also be formed with comparatively small diameters, since the source receiving tube does not have to be accommodated in the transmission tube.

Advantageously, the source receiving tube and the transmission tube of the radiometric measurement device are connected to each other at their respective longitudinal sides, the connection preferably being provided by means of a welded joint. The welded joint may be provided by individual weld points or by one or more welds on one or both sides of the joint. Particularly preferably, the two tubes are continuously connected on their longitudinal sides, for example by means of a welded joint.

Preferably, the radiometric measurement device is designed in such a way that a first fastening element is provided between the source receiving tube and the transmission tube, which fastening element is connected to the tubes in longitudinal extension, so that both tubes are arranged spaced apart from each other, wherein the first fastening element is preferably designed as a first holding plate element, and wherein the tubes are preferably each connected to the first holding plate element by means of a welded joint. The retaining sheet metal element can have different geometries or contours and is not limited to rectangular cross-sections. The fastening element, which is preferably designed as a retaining plate, can additionally increase the rigidity of the measuring device.

Preferably, the radiometric measurement device is designed in such a way that a second fastening element is provided between the source receiving tube and the transmission tube, which second fastening element is connected to the tubes in longitudinal extension, so that both tubes are arranged spaced apart from each other, wherein the first fastening element and the second fastening element are preferably arranged at least partially opposite each other in longitudinal extension, and wherein the second fastening element is preferably designed as a second holding plate element, and wherein the tubes are preferably each connected to the second holding plate element by means of a welded joint. By means of the second fastening element, the rigidity of the arrangement of the measuring device can be additionally increased, in particular the bending, torsional, compressive, and tensile rigidity of the device can thereby be increased. In this context, it is further preferred that the first fastening element and/or the second fastening element is/are provided from a common distal end of both tubes to a distal end of the source receiving tube, wherein the first fastening element is preferably provided from a common distal end of both tubes to a distal end of the source receiving tube and the second fastening element is preferably provided from a common distal end of both tubes to a distal end of the transmission tube. In this context, it is further preferred that the first fastening element and the second fastening element are arranged opposite each other in longitudinal extension up to a distal end of the transmission tube, such that a cavity is formed between the fastening elements, which cavity is preferably closed by means of a cover element. The closed cavity ensures that there is no material between the transmission tube and the source receiving tube. This can ensure, for example, that when the level is lowered below the level at which the measuring device is located in the container, no material remains in the existing cavity and is thus not separated from the source volume. Furthermore, the attached lid element can also further increase the torsional rigidity of the measuring device.

Preferably, the radiometric measurement device is designed such that the source receiving tube and the transmission tube are connected at one of their end faces to a flange element, wherein the connection is preferably provided by means of a welded joint, and wherein the flange element is preferably adapted to be connected to a correspondingly formed flange element of a container on which the radiometric measurement device is arrangeable. The connection between the corresponding flanges can be made, for example, by means of appropriately designed screw connections. The corresponding flange connection can also provide an interface for assembly or disassembly that allows non-destructive disassembly for maintenance purposes.

Preferably, the radiometric measurement device is designed such that the source receiving tube has a smaller wall thickness than the transmission tube, with the source receiving tube preferably having a smaller diameter than the transmission tube. The smaller diameter and wall thicknesses can in turn reduce manufacturing costs.

Preferably, the radiometric measurement device is designed such that the first fastening element and/or the second fastening element have/has different wall thicknesses in longitudinal extension. The increase or variation of the wall thickness can be achieved, for example, by fastening elements in composite construction, i.e., several retaining plates are mounted one above the other. The individual retaining plates do not have to be congruent over their entire length. The different wall thicknesses allow the stiffness to be increased specifically where the greatest loads are expected.

Preferably, the radiometric measurement device is designed in such a way that the first fastening element is adapted in longitudinal extension to a curved course of the source receiving tube. The curved course can be approximated by the fastening element in a rectangular or curved manner.

Preferably, the radiometric measurement device is designed such that the first fastening element and/or the second fastening element are provided as an edge part or as a surface part. In this context, the term edge part includes bent flat sheets of any profile shape. Preferably, an L-shape is used for edge parts. The term flat part includes flat parts without a profile structure, i.e., flat components.

Furthermore, the present invention relates to a radiometric measurement device comprising: at least one at least partially curved source receiving tube for reception of a radiation source; at least one transmission tube for providing a guiding path within the transmission tube for at least a portion of the radiation emitted by the radiation source; wherein the source receiving tube and the transmission tube are arranged relative to each other such that at least a portion of the radiation emitted from the radiation source is guidable in a straight line through a material disposable between the radiation source and a distal end of the transmission tube and the guiding path; and wherein the source receiving tube is received in the transmission tube; and wherein there is at least one amplifying element arranged at least partially on the source receiving tube. In this regard, it is preferred that the reinforcing member is configured as a retaining plate member and is preferably longitudinally connected to the source receiving tube via a welded joint, wherein the reinforcing member is preferably provided in the region of a distal end of the source receiving tube and extends longitudinally towards a distal end of the transmission tube.

In this alternative embodiment, the stability of a known radiometric tube-in-tube measurement device can thus be further improved without having to change the basic structure. Furthermore, this has the advantage that tube-in-tube measuring devices already in use can be equipped with a corresponding retrofit kit by providing a corresponding reinforcing element thereto.

Furthermore, the present invention relates to the use of an at least partially bent source receiving tube for reception of a radiation source and a transmission tube connected to the source receiving tube for providing a guide path, in a radiometric measurement device.

BRIEF DESCRIPTION OF THE DRAWINGS

In the following, a detailed description of the figures is provided, in which the following is shown:

FIG. 1b shows a schematic cross-sectional view of the radiometric measurement device shown in FIG. 1a;

FIG. 2b shows a schematic cross-sectional view of the radiometric measurement device shown in FIG. 2a;

FIG. 3b shows a schematic cross-sectional view of the radiometric measurement device shown in FIG. 3a;

FIG. 4b shows a schematic cross-sectional view of the radiometric measurement device shown in FIG. 4a.

DETAILED DESCRIPTION OF EMBODIMENTS

Figure 1A:
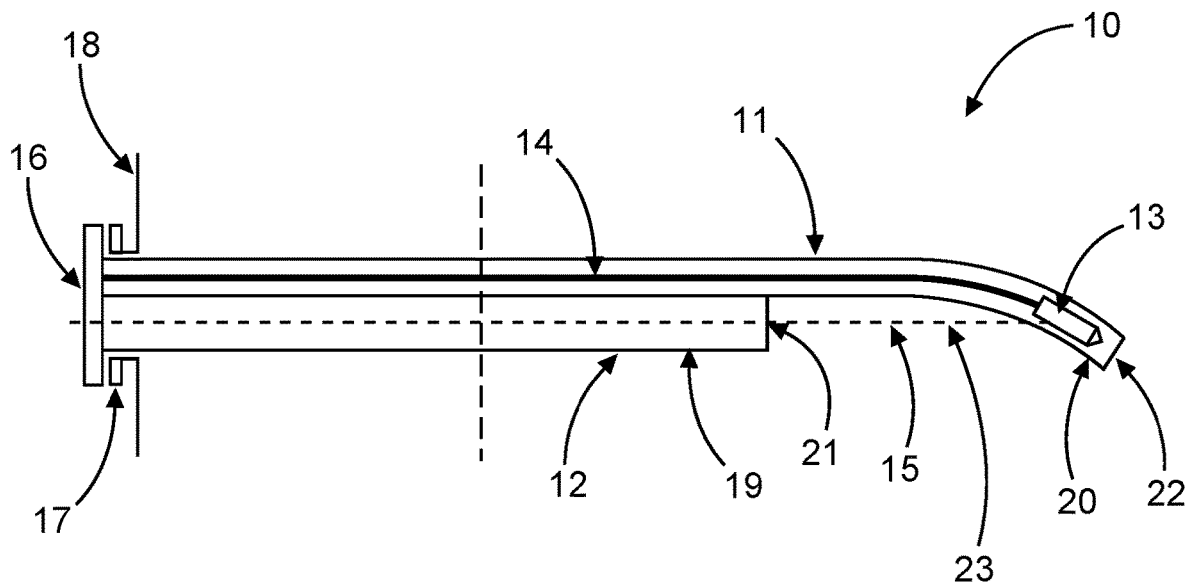
FIG. 1a shows a schematic partial view of a first preferred embodiment of a radiometric measurement device.
Figure 1B:
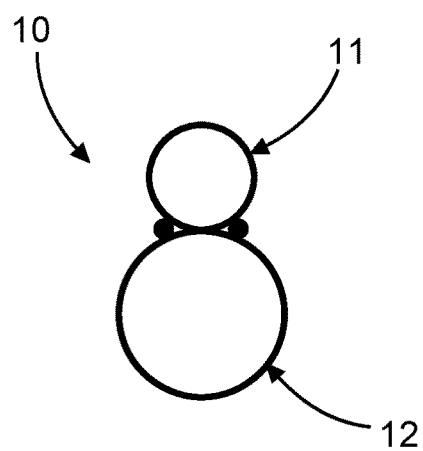

FIG. 1a shows a schematic partial view of a first preferred embodiment of a radiometric measurement device 10 according to the invention, and FIG. 1b shows a schematic cross-sectional view of the radiometric measurement device 10. With regard to the basic structure of a radiometric measurement device and the measurement principles applied, reference is made to EP 2 169 389 A1.

The radiometric measurement device 10 comprises an at least partially curved source receiving tube 11, which comprises or encloses a radiation source 13, and a transmission tube 12. The transmission tube 12 can be closed at its front distal end 19 by a cover element 21.

The radiation source 13 thereby preferably comprises a capsule for reception of a radioactive preparation. The radiation source 13 may be inserted and positioned in the source receiving tube 11, for example, by means of a positioning element 14, wherein the positioning element 14 may be, for example, a chain, a rope or an articulated rod. The front distal end of the source receiving tube 11 may in turn be closed by a cover element 22.

As shown in FIG. 1a, the source receiving tube 11 and the transmission tube 12 are arranged parallel to each other in the longitudinal direction in such a way that a beam path 15 of the radiation source 13 can be guided in a straight line through a material 23 and a guide path of the transmission tube 12.

The diameter of the source receiving tube 11 is preferably made smaller than the diameter of the transmission tube 12, but the same diameter or other diameters can also be selected. The wall thickness of the source receiving tube 11 can be smaller than the wall thickness of the transmission tube 12. The source receiving tube 11 and the transmission tube 12 are preferably each made in one piece, but can also be composed or built up from several segments. The source receiving tube 11 and the transmission tube 12 are thereby preferably provided from a metallic material, but may also comprise other materials. As shown in FIGS. 1a and 1b, the source receiving tube 11 and the transmission tube 12 are connected to each other longitudinally, the tubes 11, 12 preferably being connected to each other by means of corresponding welded joints. The welded joints are thereby preferably designed as continuous welded seams, which are preferably provided along the length of the transmission tube 12. At one of their end faces, the tubes 11, 12 are connected to or with a flange element 16, preferably by means of corresponding welded joints. A correspondingly formed flange element 17 can be provided on a container 18, so that the radiometric measurement device 10 can be arranged thereon.

During a measurement, the radiation may traverse a material 23, with the intensity of the radiation decreasing as a function of the material 23. After the radiation enters the transmission tube 12, the radiation is guided through the measurement path to the exit of the transmission tube 12. After the radiation exits the transmission tube 12, the radiation may be directed to a detector (not shown) to detect and evaluate the intensity of the radiation.

Figure 2A:
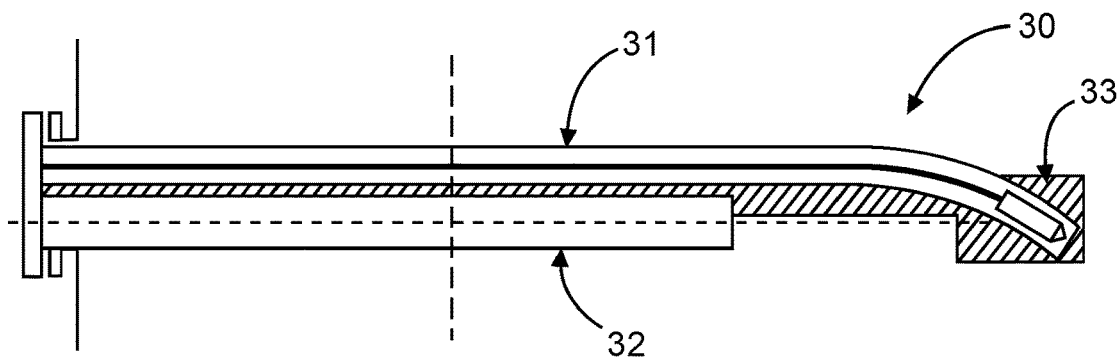
FIG. 2a shows a schematic partial view of a second preferred embodiment of a radiometric measurement device.
Figure 2B:
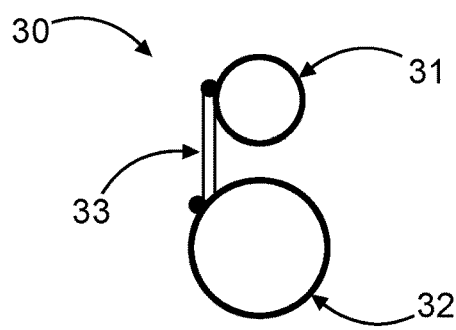

FIGS. 2a and 2b show a schematic partial view of a second preferred embodiment of a radiometric measurement device 30 according to the invention. The radiometric measurement device 30 again comprises a source receiving tube 31 and a transmission tube 32.

In contrast to the radiometric measurement device 10 shown in FIG. 1a, in the radiometric measurement device 30 the source receiving tube 31 and the transmission tube 32 are connected to each other at a distance via a fastening element 33.

The fastening element 33 is preferably in the form of a flat plate made of a metallic material, although it may also comprise or consist of a non-metallic material.

The fastening element 33 thereby preferably extends in the longitudinal direction of the transmission tube 32 and the source receiving tube 31 over the entire length of the source receiving tube 31 and thus beyond the length of the transmission tube 32. The contour of the fastening element 33 may thereby replicate the contour of the source receiving tube 31, and material protrusions may also be provided. A connection of the fastening element 33 to the tubes 31, 32 can in turn be made, for example, by means of corresponding welded joints.

Figure 3A:
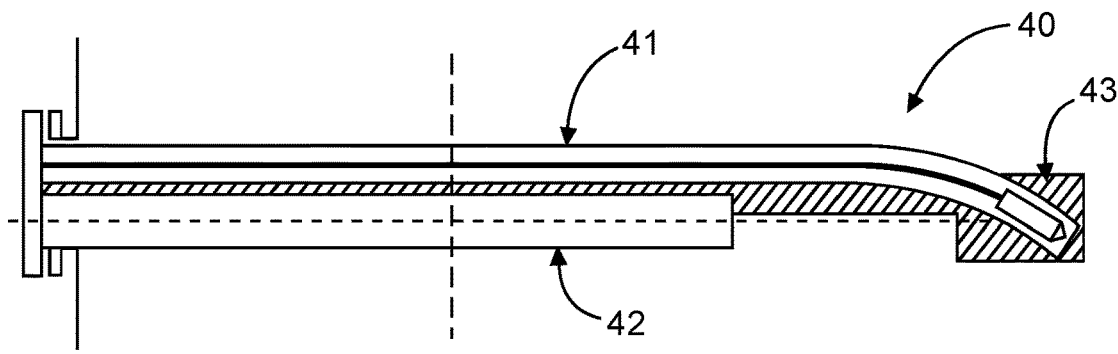
FIG. 3a shows a schematic partial view of a third preferred embodiment of a radiometric measurement device.
Figure 3B:
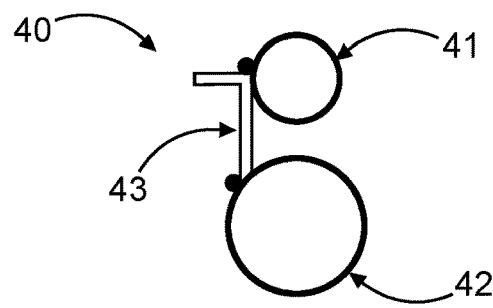

FIGS. 3a and 3b show a schematic partial view of a third preferred embodiment of a radiometric measurement device 40 according to the invention. The radiometric measurement device 40 again comprises a source receiving tube 41 and a transmission tube 42, and a fastening element 43. In contrast to the radiometric measurement device 30 shown in FIG. 2a, the radiometric measurement device 40 comprises a fastening element 43, which is designed as an edge part. The edge part can consist of metallic or non-metallic materials. The profile shape of the edge part preferably has an angular shape or an L-shape.

Figure 4A:
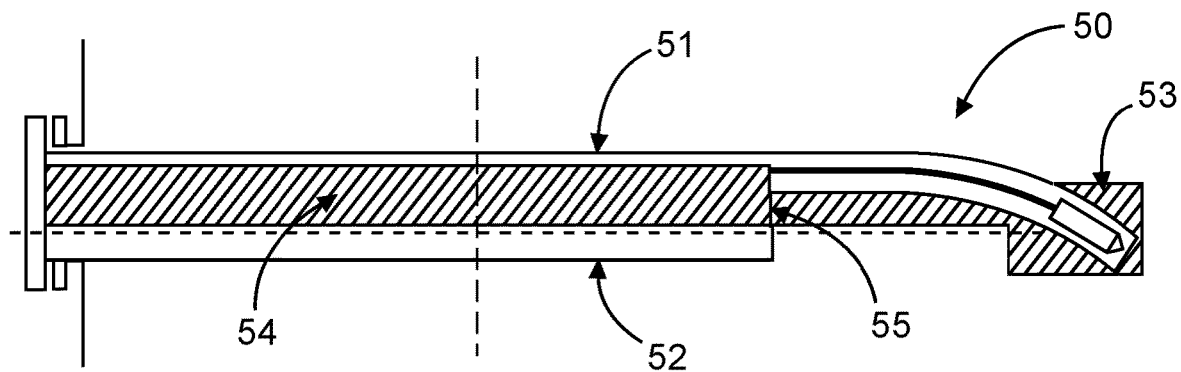
FIG. 4a shows a schematic partial view of a fourth preferred embodiment of a radiometric measurement device.
Figure 4B:
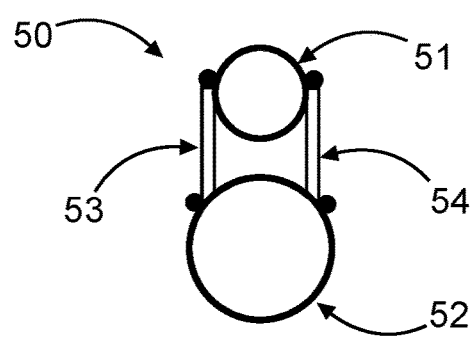

FIGS. 4a and 4b show a schematic partial view of a fourth preferred embodiment of a radiometric measurement device 50 according to the invention. The radiometric measurement device 50 again comprises a source receiving tube 51 and a transmission tube 52, wherein, in contrast to the embodiment shown in FIGS. 2a and 2b, the radiometric measurement device 50 here comprises two fastening elements 53, 54.

As can be seen clearly in FIG. 4b, the two fastening elements 53, 54 are provided opposite each other in longitudinal extension on the tubes 51, 52, preferably by means of corresponding welded joints, and form a cavity between them. The fastening elements 53, 54 are preferably again formed as flat parts made of a metallic material.

The cavity formed by the fastening elements 53, 54 can be closed at the end by a cover element 55, so that the cavity is preferably sealed.

Figure 5:
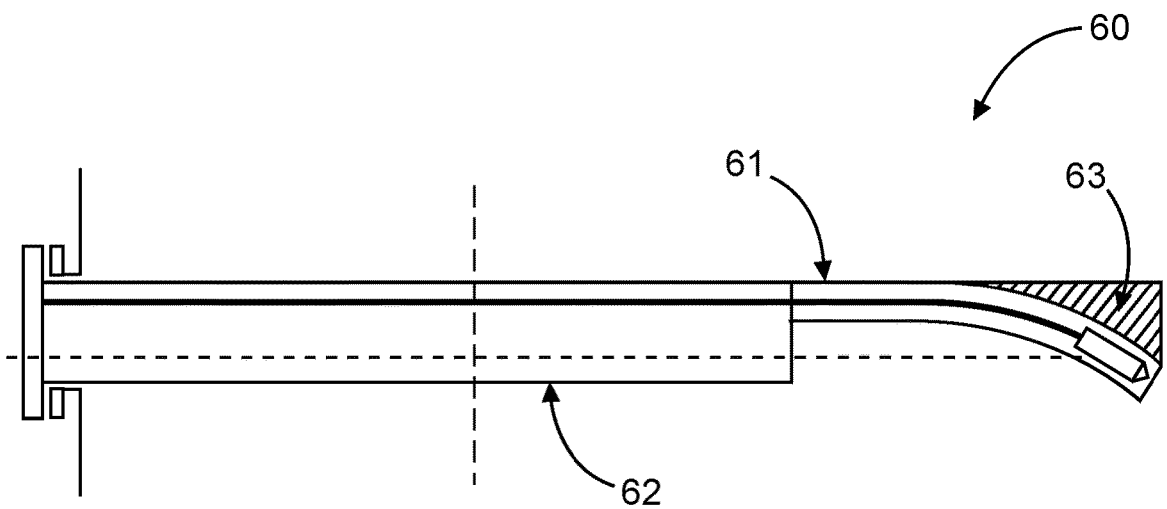
FIG. 5 shows a schematic view of a fifth preferred embodiment of a radiometric measurement device.

FIG. 5 shows a schematic partial view of a fifth embodiment of the radiometric measurement device 60 according to the invention, this embodiment having, in contrast to the above embodiments, a tube-in-tube structure. The radiometric measurement device 60 again comprises a source receiving tube 61 and a transmission tube 62. As can be seen clearly in FIG. 5, the radiometric measurement device 60 further comprises a reinforcing element 63. The reinforcing element 63 is preferably designed as a sheet metal element and is preferably connected to the source receiving tube 61 by means of a welded joint in longitudinal extension. The reinforcing element 63 may thereby be provided in a bent portion of the source receiving tube 61 to structurally reinforce the same. However, the reinforcing element 63 may thereby extend from a distal end of the source receiving tube 61 to a distal end of the transmission tube 62, or may be provided only in a portion between these distal ends. The reinforcing member 63 may be a flat plate, for example, but may also have other shapes.

However, the present invention is not limited in this respect to the foregoing preferred embodiments as long as it is encompassed by the subject matter of the following claims. Supplementally, it is noted that the terms "comprising" and "having" do not exclude other elements or steps, and the indefinite articles "one" or "a" do not exclude a plurality. Furthermore, the term "unit" is to be understood broadly, and in particular this term is not to be understood to mean that the respective units must be integral components. Also, the respective units may also be positioned differently. Finally, different units may also be combined in one assembly. Furthermore, it is pointed out that features or steps that have been described with reference to one of the above embodiments may also be used in combination with other features or steps of other embodiments described above.

REFERENCE LIST

10, 30, 40, 50, 60 radiometric measuring device
11, 31, 41, 51, 61 source receiving tube
12, 32, 42, 52, 62 transmission tube
13 radiation source
14 positioning element
15 beam path
16 flange element
17 flange element
18 container/vessel
19 front distal end transmission tube
20 front distal end source receiving tube
21 cover element
22 cover element
23 material
33, 43, 53 fastening element/holding plate
54 fastening element/holding plate
55 cover element
63 reinforcing element/sheet metal part

The invention claimed is:

1. A radiometric measuring device, comprising:
at least one at least partially bent source receiving tube configured to receive a radiation source; and
at least one transmission tube configured to provide a guiding path within the transmission tube for at least a portion of radiation emitted by the radiation source,
wherein the source receiving tube and the transmission tube are arranged relative to each other such that at least a portion of the radiation emitted by the radiation source is guidable in a straight line through a material disposable between the radiation source and a distal end of the transmission tube and the guiding path,
wherein the source receiving tube and the transmission tube are arranged adjacent to each other, and
wherein the source receiving tube is not disposed within the transmission tube.

2. The radiometric measuring device according to claim 1, wherein the source receiving tube and the transmission tube are connected to each other at respective longitudinal sides thereof by means of a welded joint.

3. The radiometric measuring device according to claim 1, wherein a first fastening element is provided between the source receiving tube and the transmission tube, the first fastening element being connected to the source receiving tube and the transmission tube in longitudinal extent so that both tubes are arranged at a distance from one another,
wherein the first fastening element is formed as a first retaining sheet metal element, and
wherein the tubes are each connected to the first retaining sheet metal element by means of a welded joint.

4. The radiometric measuring device according to claim 3, wherein the first fastening element and/or the second fastening element is/are provided from a common distal end of both tubes to a distal end of the source receiving tube,
wherein the first fastening element is provided from a common distal end of both tubes to a distal end of the source receiving tube, and
wherein the second fastening element is provided from a common distal end of both tubes to a distal end of the transmission tube.

5. The radiometric measuring device according to claim 4, wherein a second fastening element is provided between the source receiving tube and the transmission tube, the second fastening element being connected to the source receiving tube and the transmission tube in longitudinal extension so that both tubes are arranged spaced apart from each other,
wherein the first fastening element and the second fastening element are arranged at least partially opposite each other in longitudinal extension,
wherein the second fastening element is formed as a second retaining sheet metal element, and
wherein the tubes are each connected to the second retaining sheet metal element by means of a welded joint.

6. The radiometric measuring device according to claim 5, wherein the first fastening element and the second fastening element are arranged opposite each other in longitudinal extension up to a distal end of the transmission tube, such that a cavity is formed between the first and the second fastening elements, the cavity being closed by means of a cover element.

7. The radiometric measuring device according to claim 1, wherein the source receiving tube and the transmission tube are connected at one of their end faces to a flange element,
wherein the connection is provided by means of a welded joint, and
wherein the flange element is configured to be connected to a correspondingly formed flange element of a container on which the radiometric measuring device is arrangeable.

8. The radiometric measuring device according to claim 1, wherein the source receiving tube has a smaller wall thickness than the transmission tube, and
wherein the source receiving tube has a smaller diameter than the transmission tube.

9. The radiometric measuring device according to claim 4, wherein the first fastening element and/or the second fastening element have different wall thicknesses in longitudinal extension.

10. The radiometric measuring device according to claim 3, wherein the first fastening element is adapted in longitudinal extension to a curved course of the source receiving tube.

11. The radiometric measuring device according to claim 4, wherein the first fastening element and/or the second fastening element are provided as an edge part or as a surface part.

12. A radiometric measuring device, comprising:
   at least one at least partially bent source receiving tube configured to receive a radiation source; and
   at least one transmission tube configured to provide a guiding path within the transmission tube for at least a portion of the radiation emitted by the radiation source,
   wherein the source receiving tube and the transmission tube are arranged relative to each other such that at least a portion of radiation emitted by the radiation source is guidable in a straight line through a material disposable between the radiation source and a distal end of the transmission tube and the guiding path, and
   wherein the source receiving tube is received in the transmission tube, and
   wherein at least one reinforcing member is at least partially disposed at the source receiving tube.

13. The radiometric measuring device according to claim 12,
   wherein the reinforcing element is a sheet metal element and is connected to the source receiving tube,
   wherein the reinforcing element is provided in a region of a distal end of the source receiving tube and extends in longitudinal extension in a direction of a distal end of the transmission tube.

* * * * *